Aug. 1, 1939.  D. J. STEWART  2,167,695
COMBINED BUILDING AND DOMESTIC WATER HEATING SYSTEM
Filed Feb. 11, 1935
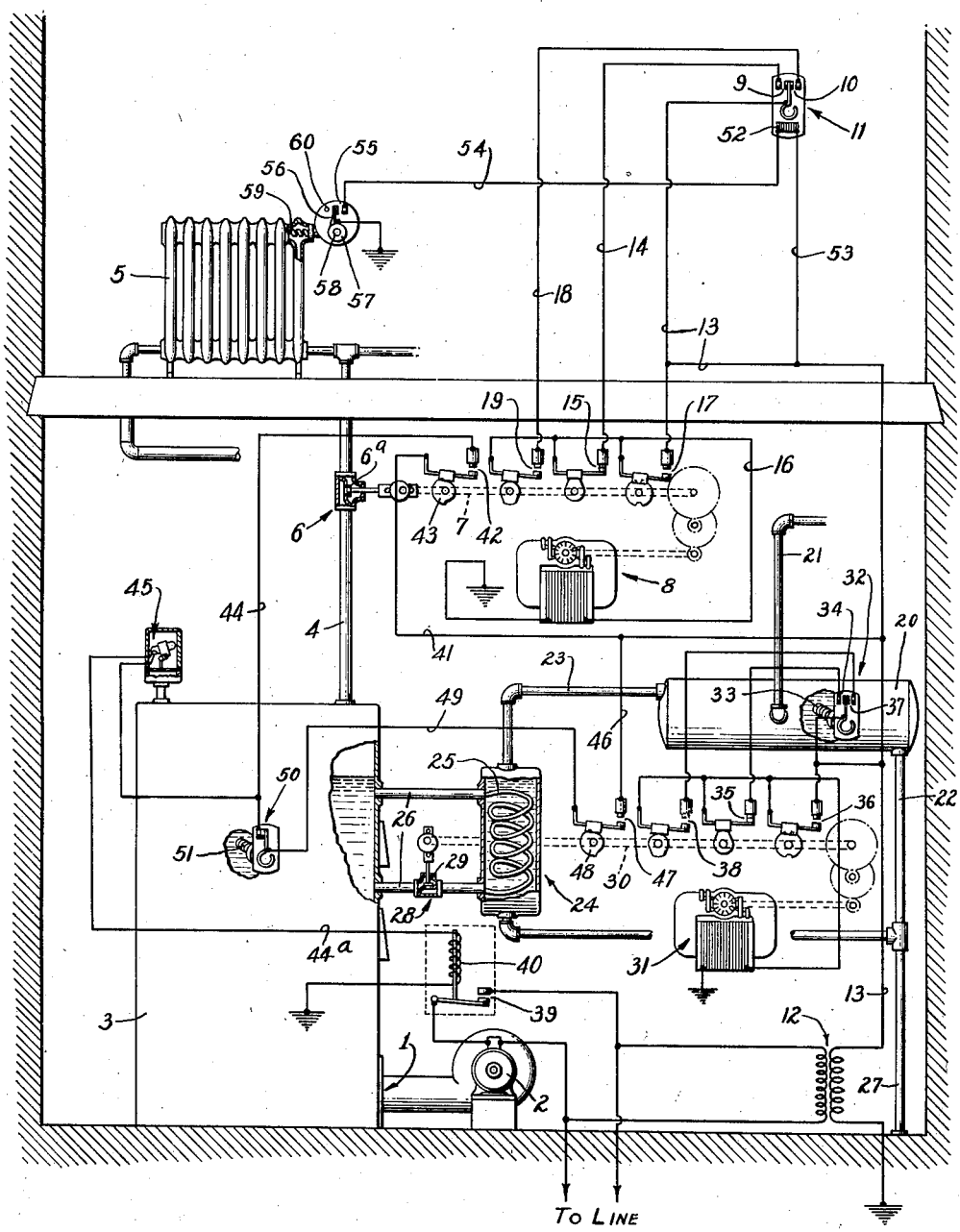
INVENTOR
Duncan J. Stewart
BY
Parker, Carlson, Pitzner Hulbert
ATTORNEYS Patented Aug. 1, 1939

2,167,695

UNITED STATES PATENT OFFICE 2,167,695

COMBINED BUILDING AND DOMESTIC WATER HEATING SYSTEM

Duncan J. Stewart, Rockford, Ill., assignor, by mesne assignments, to Barber-Colman Company, Rockford, Ill., a corporation of Illinois Application February 11, 1935, Serial No. 5,915

4 Claims. (Cl. 236—9)

This invention relates to house heating systems of the type wherein the burner is arranged to be started and stopped automatically and is utilized throughout the year to heat the domestic water supply.

The general object of the invention is to provide a thermostatic control for a system of the above character which enables the domestic water supply to be maintained at the desired temperature throughout the year, which permits the heating system to be adapted automatically for most efficient heating under all weather conditions without changing the temperature of the domestic water supply, which is readily adaptable to steam or hot water heating systems, which effects maximum conservation of heat, and which is less expensive to construct than systems of this general character heretofore used.

A more detailed object is to provide a combined system of the above character in which the flow of heated fluid to the radiators in the building and in heat exchanging relation to the domestic water supply is governed by valves controlled by individual thermostats in the space being heated and in the water supply, and in which the operation of the burner is governed by movements of said valves.

Other objects and advantages of the invention will become apparent from the following detailed description taken in connection with the accompanying drawing which is a schematic view and wiring diagram of a combined building and domestic water heating system embodying the novel features of the present invention. In the system shown, an automatic oil burner 1 driven by an electric motor 2 supplies heat to fluid in a boiler 3 from which the steam generated is delivered through a supply pipe 4 to radiators 5 by which air in different parts of the building is heated. Interposed in the supply pipe 4 is a valve 6 having a member 6ª which is moved alternately toward and from its seat in successive half revolutions of a shaft 7 driven by an electric motor 8.

Successive valve opening and valve closing cycles of the motor are initiated by closure of switches 9 and 10 of a thermostat 11 set for the maintenance of the temperature desired to be maintained in the space heated by the radiators. When the switch 9 is closed, an energizing circuit for the motor is established from a source 12 of alternating current through a conductor 13, the switch 9, a conductor 14, a switch 15 which is closed when the valve is closed, and a conductor 16 leading to the motor. The cycle is terminated by opening of a switch 17 which is closed in the initial part of each cycle and is open after the shaft 7 has turned through a half revolution. The starting circuit for the valve closing cycle extends from the conductor 13 through the switch 10, a conductor 18, and a switch 19 which is closed when the valve is in open position.

The domestic water supply is stored in a tank 20 from which heated water may be withdrawn through a pipe 21. Pipes 22 and 23 provide a system for the circulation of water through the tank 20 and a heat exchanger 24 having therein a coil 25 opposite ends of which are connected to pipes 26 which lead into the boiler at points below the normal level of the water maintained therein. Water is supplied to the circulating system through a pipe 27.

The exchange of heat between the heated boiler fluid and the water in the tank 20 is controlled by a valve 28 interposed in one of the pipes 26 and having a member 29 which is moved alternately to closed and open positions in successive half revolutions of a shaft 30 driven by an electric motor 31. These cycles are initiated by a thermostat 32 having an element 33 disposed within the tank 20 and set to detect rises and falls in the tank water temperature above and below the predetermined value of 130 degrees which is usually desired. When the water temperature falls below this value, the switch 34 will be closed completing a starting circuit for the motor 31 through the then closed switch 36 whereupon a valve opening cycle will be executed and terminated by opening of the switch 36. When the water supply rises above the desired value, a starting circuit for the motor will be completed through a switch 37 of the thermostat and a switch 38 which is closed when the valve 28 is open. With this arrangement, it will be observed that the desired temperature of the domestic water supply will be maintained accurately at all times so long as a supply of heated fluid from the boiler is available at a temperature greater than that for which the thermostat 32 is set to respond.

The invention contemplates initiating operation of the burner 1 by movement of either of the valves 6 and 28 to open position. For this purpose, the switch 39 by which the motor 2 is controlled is maintained closed whenever a magnet 40 is energized through either of two circuits one of which extends from the conductor 13 through a conductor 41, a switch 42 which is maintained closed by a cam 43 on the shaft 7 whenever the valve 6 is open, a conductor 44, a switch 45, a conductor 44ª and the magnet coil 40. A similar circuit extends from the conductor 41 through a conductor 46, a switch 47 which is closed by a cam 48 on the shaft 30 when the valve 28 is open, a conductor 49, a switch 50, the conductor 44, the switch 45, the conductor 44a, and the coil 40. The switches 42 and 47 are opened by their cams in the movement of the respective valves to closed positions, the magnet 40 being thereby deenergized and the burner stopped if the active limit switch is still closed at the time when the switch 42 or 47 is opened.

In steam heating systems, the switch 45 is opened in response to a rise in the boiler temperature to a predetermined safe maximum value which in the case of the steam system shown is evidenced by the development of a predetermined pressure to which the switch is arranged to respond. In the case of hot water heating systems, the switch would be actuated by a thermostatic member responsive to the boiler water temperature. With the control contemplated by the present invention, the switch 45 may be set to respond under all weather conditions to a temperature substantially higher than that ordinarily required for efficient heating of the domestic water supply. In order to conserve heat in maintaining the desired domestic water temperature, the switch 50 is arranged to be operated by a thermostatic element 51 arranged to respond to the temperature of the boiler water whether in a steam or hot water system, the thermostat being set for the temperature required for most efficient heating of the domestic water supply. With this arrangement, it will be observed that when the burner is started by opening of the valve 28, the burner operation will be interrupted by the limit switch 50 when the boiler water temperature has risen to a value substantially lower than that which is required to stop the burner when its operation is initiated by opening of the valve 6. Unnecessary heating of the boiler water during a substantial part of the year when the burner is used for heating the domestic water alone is thus avoided.

Heating of the water supply to the desired temperature while at the same time maintaining conditions in the house heating system most efficient for the maintenance of close regulation of the room temperature by the thermostat 11 is made possible in the present instance through the provision of means which operates automatically in response to changes in the rate of heat loss from the space being heated to vary the temperature at which heat is delivered to the rooms by the radiators 5. Herein this means includes an electric heater 52 located adjacent the thermostatic element of the thermostat 11 and arranged to be energized through a circuit which extends from the conductor 13 through conductors 53 and 54 and a switch 55 which is closed in response to a predetermined increase in the temperature of one of the radiators 5 following opening of the valve 6, and is opened when the radiator temperature decreases following closure of the valve 6 in response to closure of the thermostatic switch 10. For this purpose, the movable contact of the switch 55 is mounted on an arm 56 the hub 57 of which is coupled frictionally to a shaft 58 movable back and forth by a thermostatic helix 59 disposed in or adjacent the radiator.

To illustrate the operation of the supplemental control, let it be assumed that the thermostat 11 has called for heat and opened the valve 6, the heater 52 being then deenergized. As heated fluid circulates through the radiator 5 and the element 59 becomes heated through a few degrees, the arm 56 will be moved to close the switch 55 whereupon the heater 52 will be energized and the thermostat 11 heated thereby to a false temperature, the switch 55 remaining closed in the continued movement of the shaft 58 resulting from the further rise in the radiator temperature. When the thermostat 11 ceases to call for heat as evidenced by closure of the switch 10 as a result of the false temperature, the valve 6 is closed whereupon the radiator is allowed to cool. In the initial few degrees fall in the radiator temperature, the arm 56 is moved against a stop 60 thereby opening the switch 55 and deenergizing the heater 52 which allows the thermostat 11 to cool and initiate another heat supply cycle in the event that the room has not been raised in the previous cycle to the temperature for which the thermostat is set. With this supplemental control, heat supplying cycles will be executed intermittently causing the radiator temperature to rise or fall depending on the frequency of the cycles as determined by the prevailing rate at which heat is lost from the building being heated. In this way, the average radiator temperature is adjusted automatically to correspond to prevailing weather conditions and this without changing the setting of the limit thermostatic switch 45 or without the use of a minimum limit thermostat which would interfere with the control of the domestic water temperature.

From the foregoing, it will be apparent that with the controls above described, accurate regulation of the building and domestic water temperatures is maintained throughout the year, that the burner operates at maximum efficiency and with maximum conservation of heat under all of the varying conditions which may be encountered. In addition, the amount and complexity of the mechanism required is reduced to a minimum and frequent attention by the user for purposes of adjustment and repair is avoided.

I claim as my invention:

1. A combined building and domestic water heating system comprising, in combination, a steam boiler, a burner for heating the fluid in said boiler, a radiator for delivering heat to the space to be heated arranged to receive steam from said boiler, a valve controlling the flow of steam to said radiator, an operator for said valve, thermostatic means controlling said operator to open and close said valve in response to temperature changes in said space, a domestic water storage tank, a heat exchanger arranged to receive heated liquid from said boiler and circulate the same in heat exchanging relation to the water in said tank, a valve movable between closed and open positions to interrupt and resume the operation of said exchanger in delivering heat to said tank, a power operator for said valve, thermostatic means controlling said last mentioned operator to close and open said valve in response to rises and falls in the temperature of the water in said tank above and below a predetermined value, an electric circuit adapted when closed to initiate and maintain operation of the burner including a switch closed and opened in the movement of said first mentioned valve to open and closed positions respectively and a switch adapted to be closed when the steam pressure in said boiler is below a predetermined value, and a second circuit for initiating and maintaining operation of said burner including a switch closed and opened in the movement of said second valve to open and closed positions respectively, and a thermostatic switch adapted to be opened and closed respectively when the temperature of the boiler water rises above and falls below a predetermined value.

2. A combined building and domestic water heating system comprising, in combination, a boiler, a burner for heating fluid in said boiler, a radiator supply line extending from said boiler, a valve controlling the flow of heating fluid through said line, an operator for said valve including a rotary electric motor and means controlling the same to define successive cycles during which said valve is alternately opened and closed, a thermostat arranged to initiate successive valve opening and closing cycles of said motor in response to temperature changes in the space heated by said radiator, a domestic water supply tank, a heat exchanger through which heated fluid from said boiler may be circulated in heat exchanging relation to the water in said tank, a valve governing the flow of fluid through said exchanger, an operator for said second valve including a rotary electric motor and means controlling the same to define successive cycles during which the valve is alternately opened and closed, a thermostat arranged to initiate successive valve opening and closing cycles in response to rises and falls in the domestic water temperature relative to a predetermined desired value, a magnet adapted when energized to maintain operation of said burner, two electric circuits each controlling the energization of said magnet and having switches therein individually closed by movement of the respective valves to open position and opened by closing of the individual valves, and switching means operating to deenergize said magnet in response to a rise in the boiler temperature to a predetermined value while said second valve alone is open.

3. A combined building and domestic water heating system comprising, in combination, a radiator for delivering heat to the space to be heated, a tank containing a supply of domestic water, a heat exchanger for heating the water in said tank, a boiler arranged to supply heated fluid to said radiator and said exchanger, a burner for heating the fluid in said boiler, a valve controlling the supply of said fluid to said radiator, thermostatic means controlling said valve to cause closing and opening thereof respectively when the temperature in the space heated by said radiator rises above or falls below a predetermined value, a second valve movable between closed and open positions to interrupt and resume the operation of said heat exchanger in supplying heat to the water in said tank, power actuated means for operating said second valve, thermostatic means controlling said last mentioned means for closing and opening said second valve in response to a rise in the domestic water temperature above or a fall below a predetermined desired value, and means controlling the operation of said burner and operating to initiate the operation of the burner upon movement of either of the valves to open position and to interrupt the operation of the burner in response to closing of both of said valves or a rise in the temperature of the boiler fluid above a predetermined value while said second valve alone is open.

4. A combined building and domestic water heating system comprising, in combination, a radiator for delivering heat to the space to be heated, a tank containing a supply of domestic water, a heat exchanger through which the water in said tank may be circulated, a boiler arranged to supply heated fluid to said radiator and said exchanger, a burner for said boiler, a valve controlling the supply of heated fluid to said radiator, thermostatic means controlling said valve to cause closing and opening thereof respectively when the temperature in the space heated by said radiator rises above or falls below a predetermined value, a second valve movable between closed and open positions to interrupt and resume the operation of said heat exchanger in supplying heat to the water in said tank, power actuated means for operating said second valve, thermostatic means controlling said last mentioned means to close and open said second valve in response to a rise in the domestic water temperature above or a fall below a predetermined desired value, and means controlling the operation of said burner to initiate operation thereof when either of said valves is opened and to interrupt the burner operation when the valves are closed, and independently operating thermostatic devices responsive to the boiler temperatures one operating to interrupt the burner operation upon a predetermined rise in boiler water temperature following opening of said second valve while said first valve is closed, the other device operating to interrupt the burner operation upon a rise in the boiler temperature to a predetermined higher value following opening of said first mentioned valve.

DUNCAN J. STEWART.